Dec. 25, 1945. F. L. MOSELEY Re. 22,704

AIRCRAFT FLIGHT INDICATOR AND CONTROL SYSTEM THEREFOR

Original Filed Sept. 17, 1936 4 Sheets-Sheet 1

INVENTOR
FRANCIS L. MOSELEY
BY Herbert H. Thompson
HIS ATTORNEY

Dec 25, 1945. F. L. MOSELEY Re. 22,704

AIRCRAFT FLIGHT INDICATOR AND CONTROL SYSTEM THEREFOR

Original Filed Sept. 17, 1936 4 Sheets-Sheet 2

INVENTOR
FRANCIS L. MOSELEY
BY Herbert H. Thompson
HIS ATTORNEY

Dec. 25, 1945. F. L. MOSELEY Re. 22,704

AIRCRAFT FLIGHT INDICATOR AND CONTROL SYSTEM THEREFOR

Original Filed Sept. 17, 1936 4 Sheets-Sheet 3

INVENTOR
FRANCIS L. MOSELEY
BY Herbert H. Thompson
HIS ATTORNEY

Dec. 25, 1945. F. L. MOSELEY Re. 22,704

AIRCRAFT FLIGHT INDICATOR AND CONTROL SYSTEM THEREFOR

Original Filed Sept. 17, 1936 4 Sheets-Sheet 4

INVENTOR
FRANCIS L. MOSELEY
BY Herbert H. Thompson
HIS ATTORNEY.

Reissued Dec. 25, 1945

Re. 22,704

UNITED STATES PATENT OFFICE 22,704

AIRCRAFT FLIGHT INDICATOR AND CONTROL SYSTEM THEREFOR

Francis L. Moseley, Osborn, Ohio, assignor to Sperry Gyroscope Company, Inc., Brooklyn, N. Y., a corporation of New York Original No. 2,262,033, dated November 11, 1941, Serial No. 101,274, September 17, 1936. Application for reissue December 14, 1943, Serial No. 514,261

42 Claims. (Cl. 250—11)

This invention relates, generally, to aircraft instruments and the invention has reference, more particularly, to a novel aircraft flight indicator that conveniently and clearly indicates on its face flight information heretofore shown on the faces of a plurality of separated instruments.

The gradual increase in the accuracy and number of aircraft instruments over a period of years has greatly improved the art of flying until today blind flying, or flying entirely by instruments, is an accomplished fact. However, great difficulty is experienced by pilots in trying to simultaneously observe and intelligently follow the indications of a number of important instruments while maneuvering their craft at the same time in response to the various indications of such instruments, and this is particularly true when making blind landings. While watching one instrument, the pilot fails to see changes in the indications of other instruments, with the result that proper maneuvering of his craft is almost impossible, especially when landing as when following a radio landing beam or beams.

The principal object of the present invention is to provide a novel aircraft flight indicator and control system therefor that operates to clearly indicate on a single instrument face all of the immediate flight information needed by the pilot while flying, whether during normal flight, or while following a directional radio beam, or while landing as by means of radio beams, directional beam and a radio landing beam.

Another object of the present invention lies in the provision of a novel flight indicator and control system therefor of the above character that is so constructed and arranged as to present flight information by indications that simulate, as far as practicable, the actual attitude or orientation of the craft with respect to a reference point or points, for example, the horizon and the meridian, in such a manner that the indications may be readily understood and interpreted by reason of their distinctiveness and coordinated movement.

Still another object of the present invention is to provide a novel flight indicator and control system of the above character wherein a cathode ray tube is employed for giving the desired indications, suitable control potentials being supplied from electrical pick-off devices provided on the various conventional instruments whose indications are to be given by the instrument of the present invention, means being provided for applying the same in sequence by means of a commutating device to the cathode ray tube, thereby preventing any interference between said potentials; the design of said electrical pick-off devices and the manner of applying said control potentials to the cathode ray tube being such as to produce the desired types of indications and changes of indications on the fluorescent screen of said cathode ray tube.

A further object of the present invention lies in the provision of a novel aircraft flight indicator of the above character that is adapted to be mounted on the instrument board of an aircraft, thereby enabling a plurality of instruments to be removed from such board, if desired, thereby greatly simplifying the board, said instruments being installed in any convenient location on the craft, electric leads extending from such instruments to the flight indicator of this invention serving to convey the indications of such instruments to the flight indicator for reproduction by the latter.

Still another object of the present invention is to provide a novel aircraft flight indicator and control system therefor of the above character that is so constructed and arranged as to enable duplicate indicators or repeaters to be operated therefrom, said repeaters being located at any desired point or points of the craft.

Other objects and advantages will become apparent from the specification, taken in connection with the accompanying drawings wherein the invention is embodied in concrete form.

Figs, 6, 7 and 8 are schematic views of the face of the flight indicator, showing the indications of the instrument under varying conditions of flight.

Figure 9:
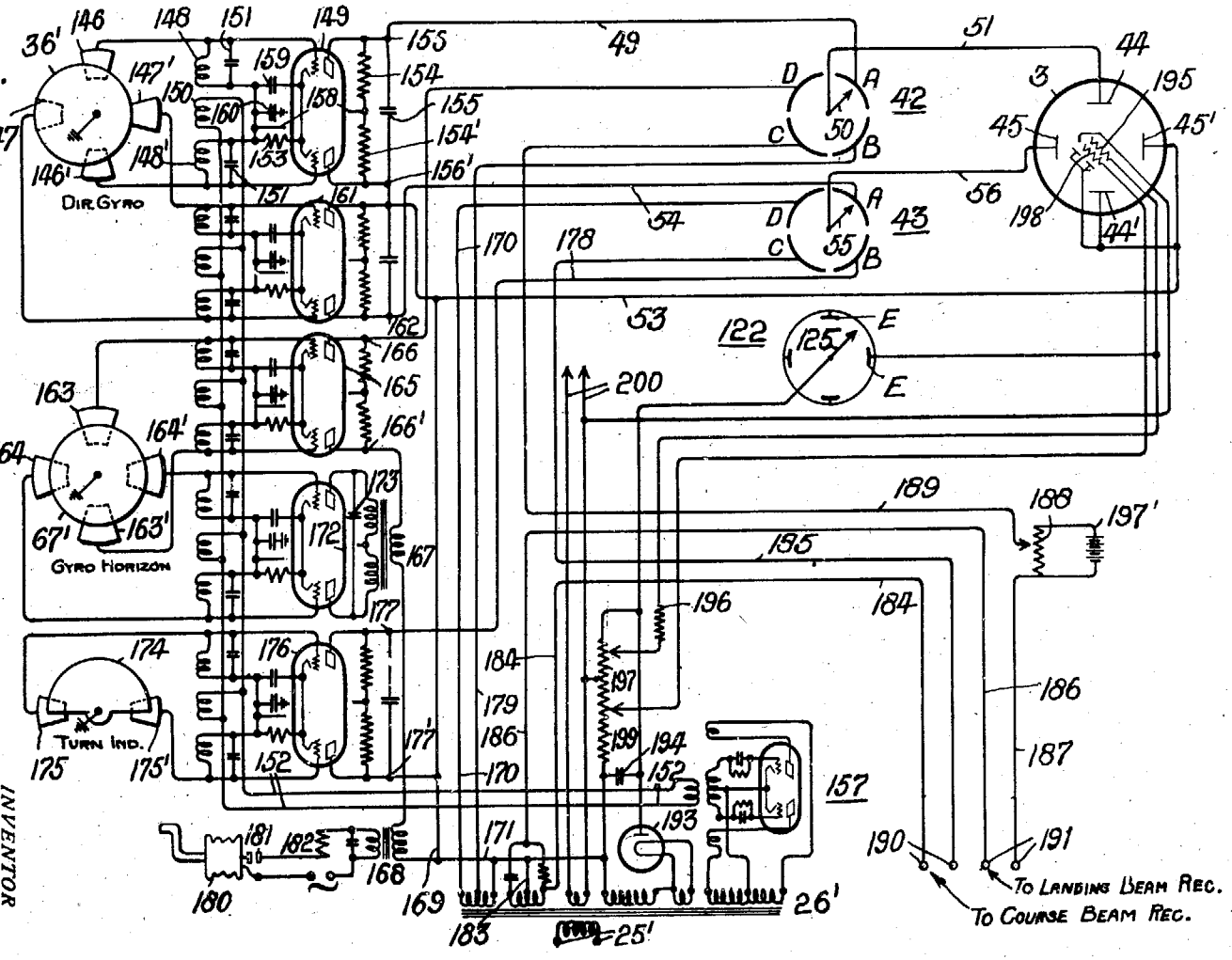

Fig. 9 is a wiring diagram of the flight indicator and somewhat modified control system therefor, the said diagram illustrating the use of capacity pick-off means from certain instruments.

Similar characters of reference are used in all of the above figures to indicate corresponding parts.

Figure 1:
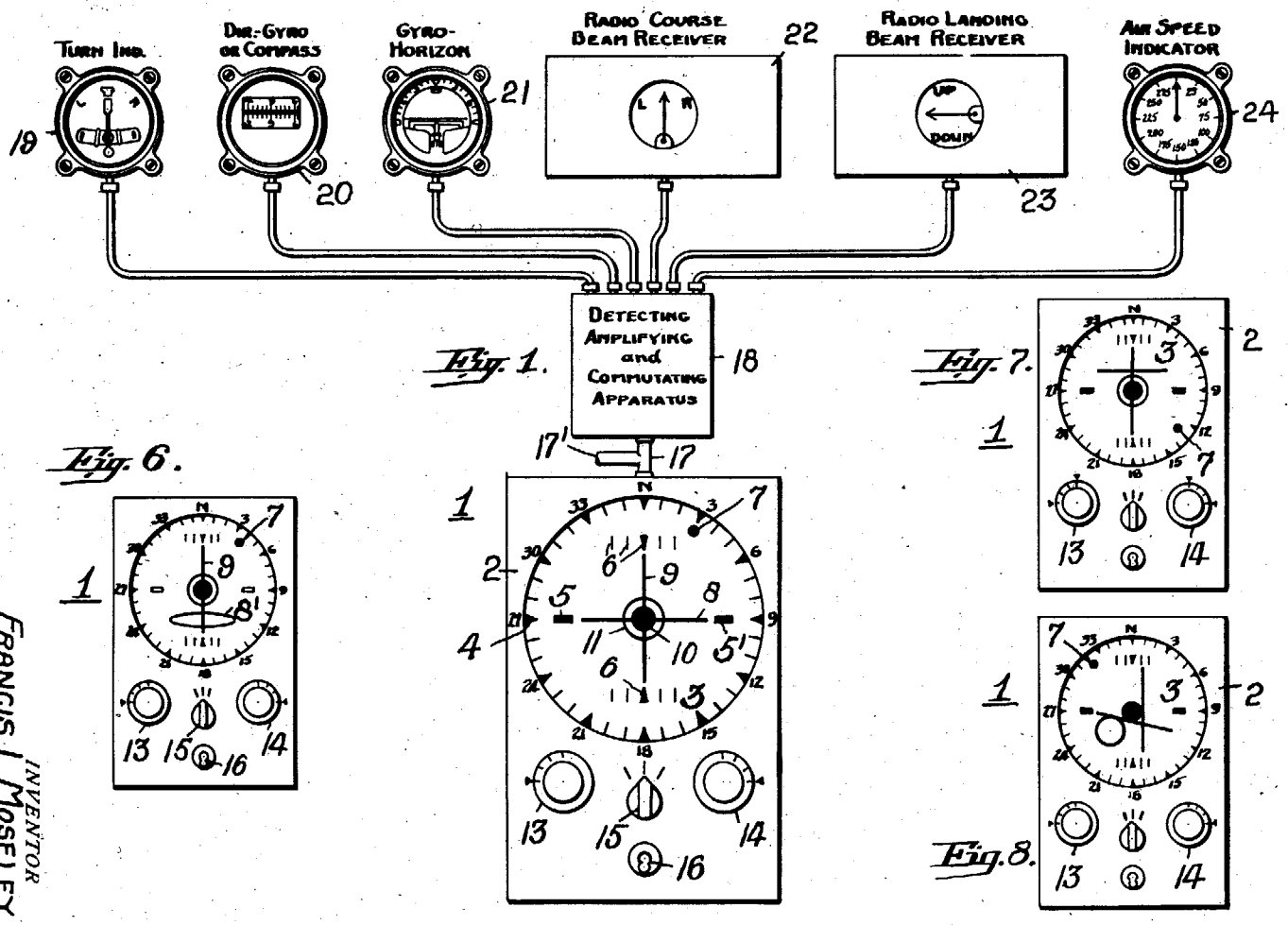
Fig. 1 is a schematic view illustrating the novel flight indicator of this invention, including typical connections of other instruments to the same.

Referring now to Fig. 1 of the drawings, the reference numeral 1 designates the novel aircraft flight indicator of this invention, which indicator is adapted to be mounted on the pilot's instrument board or at any other convenient location in the aircraft. The indicator 1 comprises a front panel 2 provided with a circular aperture for accommodating the sensitized end or face of a cathode ray tube or oscillograph 3. The face of tube 3 is provided with annularly disposed indications 4 corresponding to degree or compass markings for use in conjunction with the cathode beam spot 7 in determining the bearing or course of the craft. Short, heavy, aligned horizontal lines 5 and 5' marked on the tube face indicate the transverse axis of the aircraft and are used in conjunction with a transverse cathode beam line or artificial horizon line 8 for indicating pitch and roll of the craft, whereas vertically extending markings 6 and 6' are used in conjunction with a vertical cathode beam line 9 in indicating turns of the craft. The center of the circular tube face is provided with an opaque or black spot 10 around which extends a circular cathode beam line 11 that cooperates with spot 10 in indicating whether or not the craft is properly on a radio course or landing beam, or both. A cathode beam intensity knob 13 and a focussing knob 14 are provided on the lower half of panel 2. A switch 15 for controlling the caging and setting of the directional gyroscope and an off and on switch 16 are also provided on panel 2.

The indicator 1 is connected by an electrical cable 17, containing a number of leads, to a detecting, amplifying and commutating apparatus 18 that may be located at any convenient place on the craft and preferably adjacent the instruments whose indications are to be portrayed by the indicator of this invention. A branch cable 17' is illustrated as extending from cable 17 for the purpose of controlling additional or repeater indicators (not shown) similar to indicator 1 and located in other parts of the craft, should such additional indicators be desired. The apparatus 18 is connected by suitable cables or leads, as shown, to the various conventional rate and attitude instruments (see "Instrument Flying," by Howard C. Stark) whose indications are to be consolidated and portrayed by the indicator 1. These instruments are shown as including a turn indicator 19, a directional gyro or compass 20, a gyro or artificial horizon 21, a radio course beam receiver 22, a radio landing beam receiver 23 and an air speed indicator 24.

Although these instruments are shown in the drawings as they might appear upon the pilot's instrument board, it is to be understood that the same need not be mounted upon the instrument board, thereby greatly simplifying the latter, but may be conveniently installed in a box or cabinet at any suitable point of the craft and, further, since the indications of these instruments are to be portrayed by indicator 1, these instruments may be skeletonized, if desired, i. e., all non-essential parts of the instruments may be omitted, including their indicating faces and operating pointers or members, thereby reducing the cost thereof.

Figure 2:
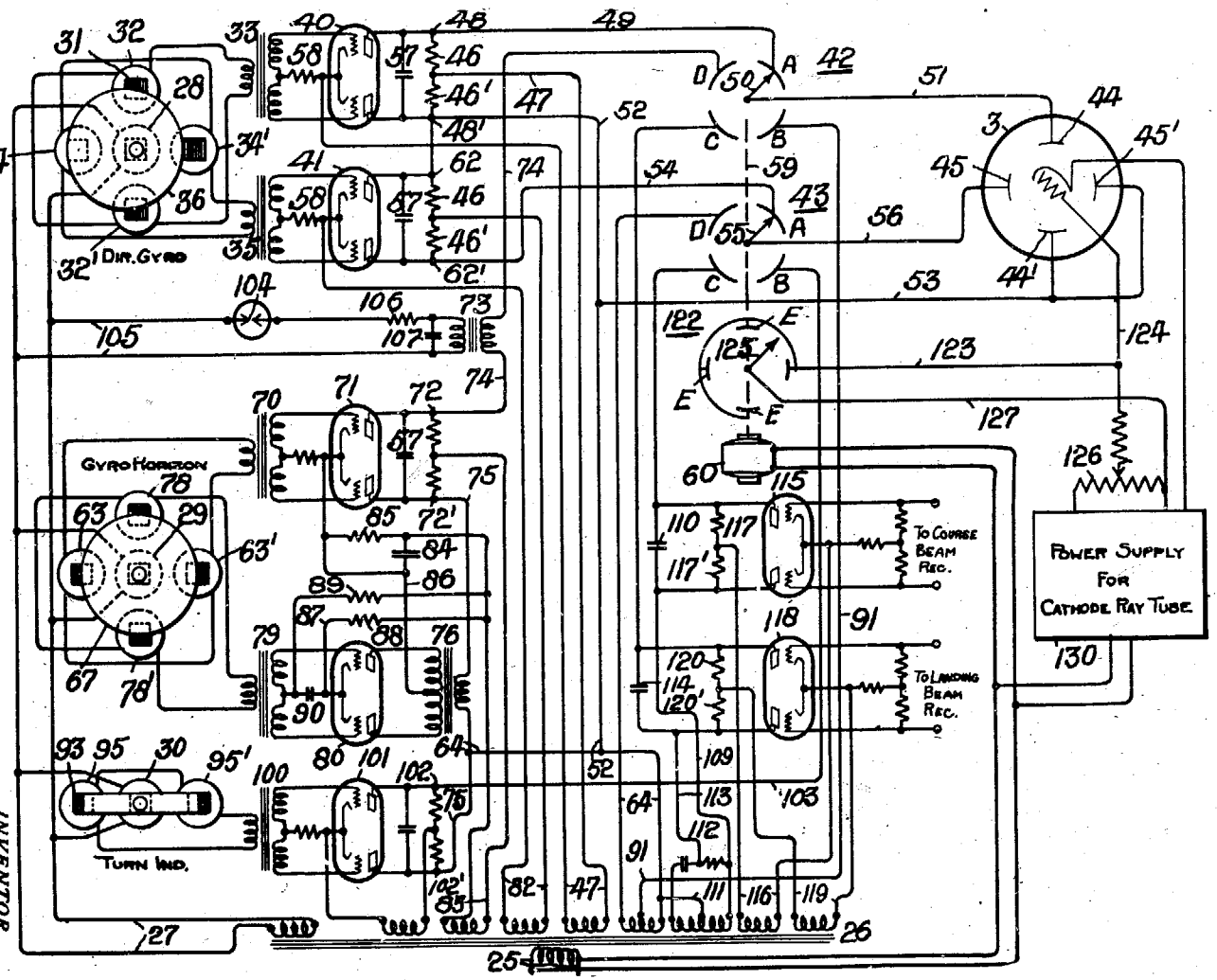
Fig. 2 is a wiring diagram of the flight indicator and control system therefor, the said diagram illustrating the use of electromagnetic pick-off means from certain instruments.
Figure 3:
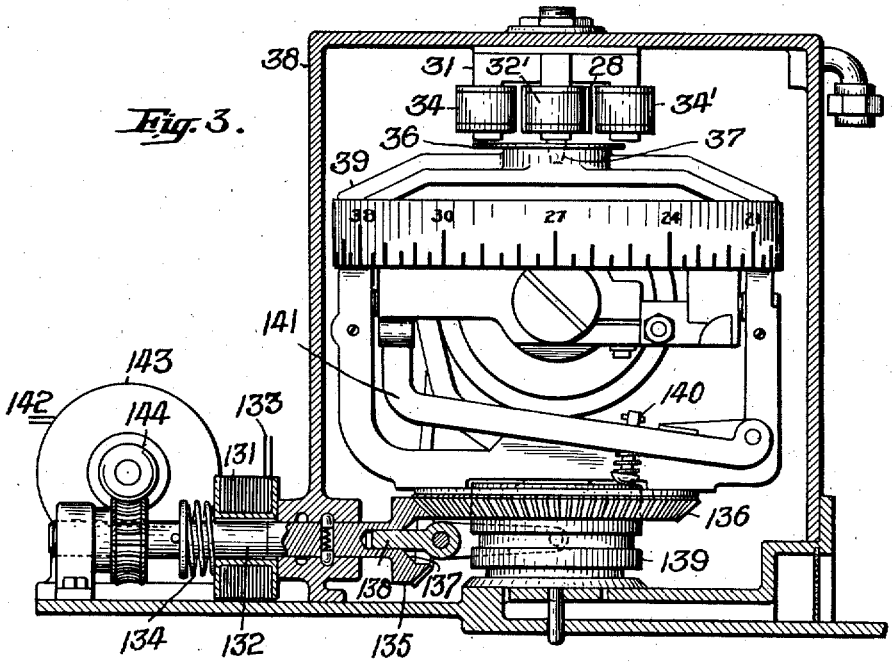
Fig. 3 is a vertical, part sectional view of a directional gyro provided with an electromagnetic pick-off that may be employed, and also showing remote controlled caging and setting means for the gyro.
Figure 5:
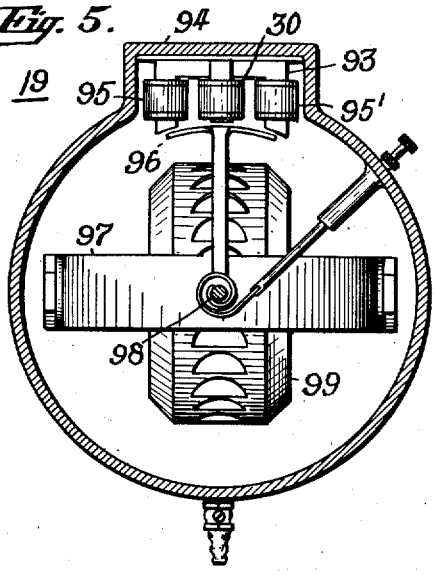
Fig. 5 is a vertical, part sectional view of a turn indicator provided with an electromagnetic pick-off.

In the wiring diagram of Fig. 2, leads 25 supply single phase A. C. to a transformer or transformer means 26 having a plurality of secondary windings. One secondary winding of transformer 26 supplies current through leads 27 to the pick-off energizing coils 28, 29 and 30 of pick-off devices or means associated with the directional gyro, the gyro horizon and the turn indicator, respectively. These instruments together with their pick-off devices or means are respectively shown in Figs. 3, 4 and 5. The coil 28 (see also Fig. 3) is mounted on the central pole of a five pole core 31 having the remaining four poles distributed at right angles to one another about the central pole. The core 31 is carried by the directional gyro housing 38 and the central pole of this core carries the upper bearing pivot pin 37 of the vertical gimbal ring 39 concentrically therewith.

One pair of diametrically opposite poles of core 31 is provided with coils 32 and 32' that are connected in series with one another and with the primary winding of an input transformer 33. Similarly, the remaining pair of diametrically opposite poles is provided with coils 34 and 34' that are connected in series with one another and with the primary winding of an input transformer 35.

A circular disc 36 of magnetically conducting material such as soft iron is fixed on top of vertical ring 39 somewhat eccentrically to the pivot pin 37 and is positioned just under the poles of core 31. Due to the eccentric mounting of disc 36, the magnetic coupling provided thereby between the energized coil 28 and the respective outer coils 32, 32', 34, 34' varies as the casing 38 turns with respect to the vertical ring 39, i. e., as the course of the craft changes, and hence the voltage outputs of the pairs of coils 32, 32' and 34, 34' varies as the course changes so that the voltage inputs to the transformers 33 and 35 correspondingly varies.

The secondaries of transformers 33 and 35 are connected to the grids of thermionic means disclosed as comprising detector-amplifier or balanced modulator tubes 40 and 41. Each of these tubes produces in its output a direct current voltage of magnitude and polarity determined by the magnitude and phase of the input A. C. supplied to its respective input transformer. These two direct current outputs are connected through synchronously driven arms 50 and 55 of commutators 42 and 43 to the vertical and horizontal deflecting plates 44, 44' and 45, 45' of the oscillograph 3, so that for any position of the directional gyro a spot 7 (Fig. 1) is produced near the periphery of the face of tube 3 in the proper position to indicate the craft's course on the scale 4.

Thus, when relative movement takes place between the directional gyro and the craft, the magnetic coupling between coil 28 and coils 32, 32' is altered and the voltage generated in the latter coils is fed through input transformer 33 and the grids of double triode tube 40 in push pull to equal resistors 46 and 46'. An A. C. plate voltage is supplied from one terminal of a secondary winding of transformer 26 through a lead 47 to the point of connection of resistors 46 and 46' and through these resistors to the plates of tube 40, the other secondary winding terminal being connected through another lead 47 to the tube cathodes.

When the signal voltage from coils 32 and 32' is zero, the D. C. voltage drops across resistors 46 and 46' are equal and opposite and the D. C. voltage between the outer terminals 48 and 48′ of these resistors is zero. However, when the signal voltage from coils 32 and 32′ is other than zero, the outputs of the plates of tube 40 are no longer balanced, one of the tube plate circuits having a larger current output than the other depending upon the direction of turning of disc 36, so that the voltages across resistors 46 and 46′ are no longer equal and a net D. C. voltage appears across points 48 and 48′. Condenser 57 smooths out this net D. C. voltage. Point 48 is connected by lead 49 to segment A of commutator 42, contact arm 50 thereof, and lead 51 to the upper vertical deflecting plate 44, whereas point 48′ is connected by leads 52 and 53 to the lower vertical deflecting plate 44′. Thus, the voltage across points 48 and 48′ appears across vertical deflecting plates 44 and 44′. Resistance 58 is a grid leak resistor common to both grids of tube 40.

Similarly, a voltage appearing across coils 34 and 34′ is fed to transformer 35, that applies the same to the grids of thermionic means disclosed as comprising detector-amplifier or balanced modulator tube 41 so that a D. C. voltage appears across the output resistors 46 and 46′ of this tube. The plate-cathode circuit of tube 41 is supplied with A. C. from transformer 26 by leads 82. The outer terminal 62 of resistor 46 is connected to terminal 48′ and by leads 52 and 53 to one of the horizontal deflecting plates, whereas the outer terminal 62′ of resistor 46′ is connected by lead 54 to segment A of commutator 43, through contact arm 55 and lead 56 to the other horizontal deflecting plate 45. Thus, the D. C. voltage across points 62 and 62′ appears across horizontal deflecting plates 45 and 45′ and this voltage, together with that across plates 44 and 44′, acts to so deflect the cathode ray beam whenever arms 50 and 55 engage segments A as to produce the spot 7 of Fig. 1, which spot moves around in a circular path adjacent scale 4 as the course of the craft is changed so that spot 7, when read upon scale 4, serves to indicate the course of the craft at any time.

The commutator arms 50 and 55 are attached to a shaft 59 driven by a synchronous motor 60. The speed of shaft 59 is preferably such that the supply current passes through a complete cycle while arms 50 or 55 are in engagement with any one of the segments A to D of the commutator, the persistance of vision of the observer of spot 7 serving to make this spot appear to be continuous although actually it is thrown upon the fluorescent screen of the tube 3 at regular rapid intervals through the action of arms 50 and 55 and commutators 42 and 43.

The gyro or artificial horizon is also equipped with two pairs of pick-off devices including coils, one of which pairs serves to produce a signal depending on whether the nose of the plane is up or down, and the other of which serves to show whether or not the wings are level. A fixed A. C. signal or voltage obtained from transformer or transformer means 26 is passed through commutator 43 and applied to the horizontal deflecting plates 45, 45′ to produce the straight horizon line or bar 8. This A. C. voltage is supplied from one side of a secondary of transformer 26 through one lead 64, segment D of commutator 43, arm 55 and lead 56 to plate 45, and from the other side of such secondary through the other lead 64, lead 52 and lead 53 to the plate 45′, thereby producing line 8.

The bar or line 8 is moved up or down as the nose of the craft moves down or up by use of a D. C. voltage applied to the vertical deflecting plates through commutator 42. This D. C. voltage is obtained from the rectified and phase detected output of one pair of gyro horizon pick-off coils turning with the craft about a transverse axis thereof. The other pair of gyro horizon pick-off coils turn with the craft about a longitudinal axis thereof and produce an A. C. signal voltage that is detected and amplified and applied through the commutator 42 to the vertical deflecting plates in such a way as to cause the horizon bar to tilt to simulate the tilting of the wings of the craft from the horizontal.

Figure 4:
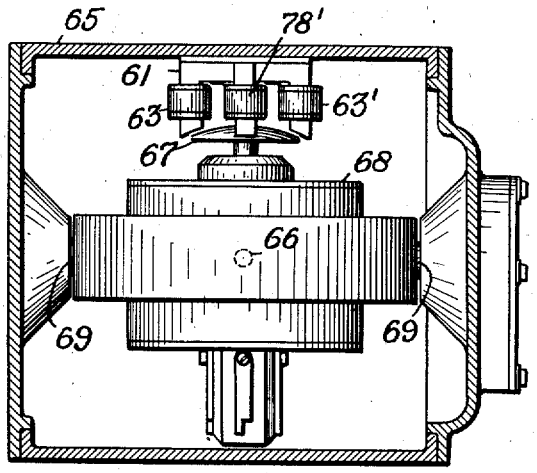
Fig. 4 is a vertical, part sectional view of an artificial or gyro-horizon provided with an electromagnetic pick-off.

Thus, the pick-off energizing coil 29 of the gyro horizon is mounted on a five pole core 61 similar to core 31 and fixed to the gyro horizon housing 65 as shown in Fig. 4. Coils 63 and 63′ on a pair of opposite poles of core 61 are adapted to turn with the craft about a transverse axis thereof, i. e., the transverse axis of the gyro horizon. A spherical segment 67 of magnetically conducting material is carried by the gyro horizon rotor bearing casing or frame 68 concentrically with the rotor axis thereof and is positioned under the poles of core 61, the center of curvature of the spherical surface of segment 67 being at the point of intersection of the gimbal bearings 66 and 69 of the gyro horizon. The pole faces of core 61 lie in an imaginary spherical surface having the same center of curvature as the surface of segment 67.

The pitching of the craft shifts the segment 67 with respect to coils 63 and 63′ to produce a signal voltage of reversible phase and variable magnitude that is supplied through an input transformer 70 to the grids of thermionic means disclosed as comprising detector-amplifier or modulator tube 71, thereby producing across points 72 and 72′ a variable magnitude, reversible D. C. voltage that is applied by lead 74 through the secondary of transformer 73, segment D, and arm 50 to vertical deflecting plate 44 of tube 3 and by lead 75 through the secondary of transformer 76, lead 64, lead 52 and lead 53 to the common point of plates 44′ and 45′ and hence to plate 44′. Thus, when the nose of the craft rises and falls, the bar or line 8, acted upon by D. C. potentials on plates 44 and 44′ derived from tube 71, is caused to be lowered or raised to simulat the apparent motion of the horizon.

The roll of the craft shifts the segment 67 with respect to the other pair of coils 78 and 78′ on core 61 to produce a signal voltage of reversible phase and variable magnitude that is supplied through transformer 79 to a thermionic push pull amplifier tube means 80. The plates of tubes 80 are supplied with a D. C., i. e., rectified A. C. potential by means of tube 71 also serving as a rectifier. This will be apparent when it is noted that the plate-cathode circuit of tube 71 is supplied with A. C. from transformer 26 through leads 83 and that connected in this circuit is a filter consisting of condenser 84 and resistance 85 so that the operation of tube 71 causes a D. C. potential to be supplied through lead 86 to the center point of the primary winding of output transformer 76 and thence to the plates of tube 80. The grids of tube 80 are connected through lead 87 and the grid bias resistor 88 to lead 83. Resistance 89 and the condenser 90 serves as a degenerating network to eliminate any "motorboating" of tube 80 due to possible variations in its plate potential and grid bias.

Thus tube 80 serves to supply an amplified version of the reversible phase, variable magnitude A. C. signal voltage supplied by coils 78 and 78' to the secondary of transformer 76. One side of the secondary of this transformer is connected through lead 75, point 72' to point 72, lead 74 through the secondary of transformer 73, segment D, arm 50 and lead 51 to the vertical deflecting plate 44. The other side of the secondary of transformer 76 is connected through leads 64, 52 and 53 to the vertical deflecting plate 44'. Since the voltage output of amplifier 80 is in phase with the voltage supplied through leads 64 to produce line 8, the addition of these voltages vectorially causes the horizon bar or line 8 to tilt in accordance with the tilting of the wings of the craft so that the line 8 gives all of the indications of the horizon bar of the gyro-horizon.

The vertical cathode beam line 9 (Fig. 1) is traced by A. C. supplied from transformer means 26. A lead 91 supplies the potential at one point of a secondary of transformer 26 through segment B, arm 50 and lead 51 to one vertical deflecting plate 44, whereas the potential of another point of this transformer secondary is connected through lead 64, lead 52 and lead 53 to the other vertical deflecting plate 44', thereby causing the line 9 to be traced on the face of the tube 3. In order to cause the line 9 to shift or move from side to side corresponding to the turning of the plane, a suitable A. C. signal voltage is picked off the turn indicator 19 and, after detection and amplification, is applied to the horizontal deflecting plates 45 and 45' as a D. C. control potential.

The turn indicator pick-off energizing coil 30 is mounted on a three pole core 93 (see Fig. 5) having its three poles arranged in a line with coil 30 on the center pole. Core 93 is fixed to the turn indicator housing 94. Coils 95 and 95' on the remaining poles of core 93 and coil 30 are inductively related to a cylindrical segment 96 of magnetically conducting material carried by the ring or rotor bearing frame 97 that is journaled for oscillation about a horizontal axis 98, the rotor 99 being journaled for rotation on ring 97 on an axis extending at right angles to axis 98.

The turning of the craft causes segment 96 to shift with respect to coils 95 and 95' to produce a signal voltage of reversible phase and variable magnitude that is supplied through an input transformer 100 to the grids of thermionic means disclosed as comprising detector-amplifier or modulator tube 101, thereby producing across points 102 and 102' a variable magnitude, reversible D. C. voltage. Point 102 is connected by lead 103 through segment B, arm 55 and lead 56 to one horizontal deflecting plate 45 of tube 3, whereas point 102' is connected through leads 75, 64, 52 and 53 to the other horizontal deflecting plate 45'.

Thus, when the nose of the craft turns to the right or left, the vertical line or bar 9, acted upon by D. C. potentials on plates 45 and 45' derived from tube 101, is caused to be moved to the right or left with respect to the central marking 6 to indicate the turn.

In case the air speed of the craft should fall below a predetermined safe minimum, the air speed indicator 24 or a Pitot tube actuated bellows is employed to close a pair of contacts 104 (see Fig. 2), thereby connecting leads 27 through a pair of leads 105 to a phase shift network 106, 107 supplying a transformer 73 having one terminal of its secondary connected through lead 74, segment D, arm 50 and lead 51 to vertical deflecting plate 44, while its other terminal is connected through leads 74, 75, 64, 52 and 53 to plate 44'. This out of phase voltage serves to distort the bar 8 into an ellipse such as shown at 8' in Fig. 6, thereby serving as a warning to the pilot to immediately increase the engine throttle opening. It will be apparent that instead of distorting the line 8 into an ellipse, the same may be distorted into other shapes by a properly applied out of phase voltage of the same or different frequency.

Sections C of the synchronously driven commutators 42 and 43 serve to switch the tube 3 to the radio course and landing beam circuits. A fixed voltage is obtained from transformer 26 and separated into two components 90° apart, which, when applied to tube 3, produces the small circle 11 surrounding the black spot 10 (see Fig. 1) in the center of the screen. This circle 11 is moved horizontally by use of a D. C. voltage added in series with the horizontal deflecting plates to indicate departure of the craft from the radio beam. This D. C. voltage is the rectified output of the radio course beam receiver. The radio beam circle is moved vertically by means of a D. C. voltage added in series with the vertical deflecting plates to show departure of the craft from a radio glide landing beam. This D. C. voltage is obtained from the landing beam receiver output. Thus, to produce the circle 11 a lead 109 connects one end of a secondary of transformer 26 through a condenser 110, section C, arm 55, and lead 56 to horizontal deflecting plate 45, while the other horizontal deflecting plate 45' is connected through lead 53, lead 52, lead 64, and lead 111 to the center tap of the secondary, thereby applying an A. C. potential to these plates in phase with the supply. An equal A. C. voltage shifted in phase 90°, however, is provided by use of a condenser-resistance phase shift network 112 connected to the ends of the secondary winding, this voltage being supplied through lead 113, condenser 114, section C, arm 50, lead 51 to one vertical deflecting plate 44, the other vertical deflecting plate 44' being connected through lead 53, lead 52, lead 64 and lead 111 to the center tap of the secondary. These 90° out of phase signal voltages by vector addition produce a sweeping beam that describes the circle 11.

When the craft departs laterally from the radio direction beam course, the reversing D. C. indications, normally fed to the zero center meter of the conventional course beam receiver 22 (Fig. 1), are fed through the D. C. amplifier tube 115 and added in series with the circle drawing voltage being fed the horizontal plate 45 of tube 3, thus deflecting the circle 11 from side to side, indicating the departure of the craft from the radio course. This addition voltage is applied across condenser 110 in lead 109. The plates of tube 115 are supplied from a secondary of transformer 26 through lead 116 and equal resistors 117 and 117'.

Similarly, when the craft departs from the radio landing beam, the reversing D. C. indications normally fed to the zero center meter of the conventional radio landing beam receiver 23 (Fig. 1) are fed through the D. C. amplifier tube 118 and added in series with the circle drawing voltage being fed the vertical plate 44 of tube 3, thus deflecting the circle 11 up and down, indicating the departure of the craft from the landing beam course. This addition voltage is applied across condenser 114. The plates of tube 118 are supplied from a secondary of transformer 26 through lead 119 and equal resistors 120 and 120'.

Figs. 6 to 8 show the indications of the instrument under varying operating conditions of the craft. Thus, in Fig. 6, the craft's course is 40°, the ship's nose is up as when climbing, and since the horizon bar 8 has opened up into an oval, the craft has fallen below the predetermined safe minimum air speed and hence is about to stall. The line 9 in central position shows that the craft is moving straight ahead and the circle 11 concentric with spot 10 shows that the craft is on the radio beam course and radio landing beam course. In Fig. 7 the nose of the craft is down, the course is 130°, the craft is moving straight ahead and is on both radio beams. In Fig. 8 the nose of the craft is up in making a climbing turn, the craft being off both the radio course beam and the radio landing beam.

With the synchronous motor 60 driving the commutators 42 and 43, there would ordinarily be a back trace on the screen of tube 3, which back trace is drawn by the electron beam in its passage from one indication to the next. This back trace is annoying and is eliminated by cutting off the electron beam during the transition period. To do this, a commutator 122 is employed having its segments E respectively aligned with the gaps of commutators 42 and 43. Segments E are connected together and to the control grid of the cathode ray tube 3 by leads 123 and 124. Rotating arm 125 driven from motor 60 is connected to the "out" end of potentiometer 126 by lead 127, so that when arm 125 engages one of the segments E it connects the tube control grid to the "out" end of potentiometer 126, thereby so increasing the negative bias on the tube grid that the cathode ray beam is momentarily shut off during each transition period. In Fig. 2 of the drawings, all heater connections have been omitted for the sake of simplicity, and the means for supplying filament, plate and focussing potentials for tube 3 have been grouped together in the box 130, since the same are entirely conventional.

In the event that the several instruments whose indications are portrayed by the instrument of this invention are located at a point remote from the pilot's dash, such as in a box or cabinet at another point of the craft, then remote control means must be provided for caging and setting the directional gyroscope from the pilot's position. To accomplish this, the panel 2 is provided with the switch 15. When switch 15 is turned one notch from off position, it completes a circuit through leads 133 for a suitable motive means, such as a solenoid 131 (see Fig. 3), thereby causing this solenoid to move its core 132 to the right in Fig. 3 against the tension of spring 134 into the position shown in this figure. Such inward movement of the core 132 moves a gear 135 into mesh with a gear 136 on the base of the vertical ring 39. At the same time a conical recess 137 in gear 135 serves to centralize a pin 138, thereby raising a collar 139 and lifting pin 140 and locking arm 141 to effect the caging of the gyro.

Switch 15 is now turned another notch, thereby completing a circuit through leads 142 to a motor 143, causing this motor to operate through gearing 144 to turn core 132 and gear 135, and hence gear 136, thereby turning the vertical ring and gyroscope in azimuth. The turning of the gyroscope will cause spot 7 to move around in a circular path adjacent scale 4 of the flight indicator on the pilot's dash, so that when the reading of spot 7 on scale 4 corresponds to the reading of the magnetic compass, the pilot turns switch 15 off, thereby stopping the motor 142, deenergizing solenoid 131 and uncaging the gyro due to the action of spring 134 in retracting gear 135. Patent #1,946,657 to Zand shows a manual caging and setting means using the mechanism shown within the lower part of housing 38.

In the form of the invention shown in Fig. 9, electrostatic pick-off or pick-off means from the directional gyro, the gyro horizon, and the turn indicator are employed in lieu of the electro-magnetic pick-offs shown in the preceding figures, thereby minimizing the possibility of coercion. Similar parts of Figs. 9 and 2 are similarly numbered and some parts, such as the drive for the commutators, have been omitted to simplify the drawings. In Fig. 9 the directional gyroscope is provided with an eccentrically mounted grounded condenser plate disc 36' instead of the magnetic disc 36 of Figs. 2 and 3. Disc 36' cooperates with diametrically arranged pairs of segmental condenser plates 146, 146' and 147, 147' that are carried by the gyro housing and are disposed about the disc 36' in the same manner as the poles of core 31 in Fig. 3.

Condenser plates 146 and 146' are connected to input coils 148 and 148' in circuit with trimmer condensers 151 that are in turn connected to the grids of thermionic means disclosed as comprising a detector-amplifier or balanced modulator tube 149. A coupling coil 150 is inductively related to coils 148 and 148' and is supplied with a high frequency alternating current from an oscillator 151 through leads 152, the oscillator being supplied in turn from the transformer 26' energized from leads 25'. Coil 150 induces current in coils 148 and 148' and the voltage across either of these coils may be varied at will by tuning them toward or away from resonance either by varying the capacity between condenser disc 36' and plates 146, 146' or by adjustment of the trimmer condensers 151. Preferably, the condensers 151 are so adjusted that when the capacity between disc 36' and plate 146 is equal to that between disc 36' and plate 146', then the voltage across each of the coils 148 and 148' is half way down its resonance curve. Thus when disc 36' turns in response to the turning of the craft so as to cause disc 36' to cover a greater portion of plate 146, for example, and hence a lesser portion of plate 146', then coil 148 will be brought nearer to resonance while coil 148' will be turned further from resonance. Hence, the voltage applied to the upper grid of tube 149 will increase while that applied to the lower grid of this tube will decrease.

Alternating current of commercial frequency is supplied to the plate-cathode circuits of tube 149 through external leads 158 connected, preferably, to a secondary (not shown) of transformer 26'. A resistor 153 connected between a lead 158 and the tube cathodes serves to bias tube 149 as a detector and, hence, as the voltages applied to the grids of tube 149 are oppositely varied, the plate currents drawn through output resistors 154 and 154' will be unequal, so that with the aid of smoothing condenser 155 a net D. C. voltage will appear across points 156 and 156'. This D. C. voltage is applied through lead 49, commutator 42, arm 50 and lead 51 to one vertical plate 44 of oscillograph 3, and through lead 53 to the other vertical plate 44' of tube 3 just as described in connection with Fig. 2 of the drawings. A bias filter condenser 159 is used in conjunction with bias resistor 153 and a blocking condenser 160 is inserted between ground and the points of connection of condenser 159 and resistor 153.

Condenser plates 147 and 147' of the directional gyro are similarly connected to a detector-amplifier tube or thermionic means 161, the output of which provides variable magnitude D. C. voltages across points 156' and 162. Point 162 is connected through lead 54, commutator 43, arm 55 and lead 56 to horizontal deflecting plate 45, whereas point 156' is connected through lead 53 to the other horizontal deflecting plate 45'. As the craft moves relative the directional gyro due to a change of course, the output voltages of the detector-amplifiers appearing across points 156, 156' and 162 are proportional to the deflection of the ship from course, and these voltages applied to the four deflecting plates of tube 3 act to deflect the beam by the vector sum of these voltage components, thereby producing the spot 7 (Fig. 1) which, when read on scale 4, accurately indicates the ship's course just as in the previous form of the invention.

The gyro horizon is fitted with a condenser plate having the form of a grounded spherical segment 67' that cooperates with pairs of diametrically arranged segmental condenser plates 163, 163' and 164, 164', so carried by the gyro housing that as the craft pitches or rolls, opposite sets of plates are energized to unbalance the output of the amplifiers associated therewith. Thus, if plates 163, 163' are on a longitudinal axis of the craft, the pitching of the craft will cause these plates to be differentially affected and the output of the connected thermionic detector-amplifier 165 unbalanced, thus producing a D. C. voltage across points 166 and 166', which voltage is communicated from point 166 through section D of commutator 42 to the vertical axis or plate 44 of oscillograph tube 3, and from point 166' through the secondaries of transformers 167 and 168 and leads 169 and 53 to the vertical plate 44'. Thus, this D. C. voltage applied to the vertical axis of the tube will raise and lower whatever indication is present on the horizontal axis. This indication is a straight transverse line produced by an A. C. voltage on horizontal deflecting plates 45 and 45' so that as the nose of the craft rises, the transverse line corresponding to the horizon falls, and vice versa. The A. C. voltage producing the artificial horizon line 8 (see Fig. 1) is supplied from a secondary of transformer 26', one side of this secondary being connected through lead 170 and section D of commutator 43 to plate 45, the other side of the secondary being connected through leads 171, 169 and 53 to the plate 45'.

When the wings of the craft are tilted, plates 164 and 164' are differentially affected, thereby causing the plate circuits of thermionic detector-amplifier 172 to draw unequal currents through the equal halves of the primary of transformer 167, across which a condenser 173 is connected to bypass R. F. An A. C. voltage is thus produced in the secondary of transformer 167, which voltage is connected to add in series with the D. C. voltage applied to the vertical axis of tube 3 from detector-amplifier 165. This A. C. voltage is arranged to be directly in phase with the A. C. voltage producing the horizon line 8 and hence adds vectorially with the latter to produce a tilt in the horizon line or bar proportional to the departure of the wings or transverse axis of the craft from the horizontal.

The electrostatic or capacity pick-off from the turn indicator is accomplished by use of a grounded semicircular condenser plate 174 attached to ring 97 on axis 98 (see Fig. 5) and cooperating with diametrically disposed segmental condenser plates 175, 175' carried by the gyro housing, which plates are connected as in the previous pick-off to the grids of thermionic detector-amplifier 176. As the turn indicator operates, tube 176 produces at points 177 and 177' variable magnitude, reversible D. C. voltages that are communicated from point 177 through lead 178 and commutator 43 to horizontal deflecting plate 45 and from point 177' through leads 169 and 53 to plate 45'. Thus, a D. C. voltage is present in the horizontal axis of the tube 3 which will deflect whatever image is being placed on the tube face by the vertical plates by an amount proportional to the rate of turn. The vertical axis of the tube 3 is synchronously supplied with an A. C. voltage from a secondary winding of transformer 26'. This A. C. supply is by way of lead 179 through commutator 42 to vertical plate 44 and by way of leads 171, 169 and 53 to vertical plate 44', thereby producing the vertical line 9 of Fig. 1. Hence line 9 will be deflected transversely in one direction or the other as the craft turns. When a turn is completed, the turn indicator will return to normal, the detector-amplifier 176 will be balanced so that no deflecting voltage is supplied to the horizontal axis of the tube 3, and the A. C. voltage across the vertical plates will return to its central position on the tube face or screen.

Means similar to that shown in Fig. 2 is provided for distorting the artificial horizon line or bar when the air speed falls below a predetermined value. Thus, in Fig. 9, the bellows 180 connected to a Pitot tube is fitted with contacts 181 in circuit with an A. C. source, such as a secondary of transformer 26', and a phase shifting condenser and resistance combination or network 182, the out of phase output of which is fed through transformer 168 for application to the vertical plates of tubes 3 synchronously with the application of the remaining horizon bar voltages.

From the foregoing description it will be seen that I have provided a showing on the face of a cathode ray tube of indications of the attitude or orientation of the craft, about climb and bank axes, as furnished by the gyroscopic horizon, an indication of heading or orientation in azimuth from the directional gyroscope, an indication of direction and rate of turn from a rate of turn gyroscope, and an air speed indication, all of which indications are actuated from instruments on the craft. In addition, I prefer to show on the same cathode ray tube an indication or indications of the position in space of the craft in azimuth and elevation with respect to a radio landing beam or beams.

To this end, means is provided in Fig. 9 for producing the small circle 11 surrounding the black spot 10 (see Fig. 1) in the center of the screen. This means is similar to that of Fig. 2 and hence will require but a brief description. The center tap of a secondary winding of transformer 26' is connected through leads 183, 171, 169 and 53 to the common of the horizontal and vertical deflecting plates of tube 3. An end of the secondary winding is connected through lead 184, in series with the output of the course beam receiver, lead 185, commutator 43 to the other horizontal plate 45, so that the horizontal plates are supplied with a fixed A. C. voltage equal to one half the output of the transformer secondary. At the same time the vertical plates of tube 3 are supplied with an A. C. voltage of equal magnitude but shifted in phase 90°, this supply being through lead 186 in series with the output of the landing beam receiver, lead 187, potentiometer 188, lead 189 and commutator 42 to one vertical plate, and also through leads 183, 171, 169 and 53 to the other vertical plate, thereby producing the circle 11.

If the craft departs from its course, the reversible D. C. output of the course beam receiver supplied through terminals 190 will cause the circle 11 to move transversely to indicate such departure. In a similar manner, the radio circle 11 could be moved vertically across the face of the indicator tube by means of reversible D. C. voltages from the output of a landing beam receiver as described in connection with Fig. 2, the receiver operating in response to a directional slanting beam received by a directional loop operating in a vertical plane. If, however, the field is fitted with a landing beam transmitter arranged to supply the Department of Commerce "bent beam," a different arrangement of voltage supply to the vertical axis of the indicator tube 3 is necessary and such an arrangement is illustrated in Fig. 9. This bent type of beam is followed on a constant intensity basis and hence the rectified output of the landing beam receiver is shown supplied through terminals 191, potentiometer 188 and battery 197′ to the vertical deflecting plates of tube 3. Potentiometer 188 is so adjusted as to place the radio circle 11 in the exact center of the screen when the output of the landing beam receiver is at its reference level. If the craft should then start to fly too high, for example, it will move nearer the center of the beam and the signal strength will increase, thus driving the circle 11 downwardly on the screen of tube 3. On the other hand, should the craft start to fly too low, the received signal will decrease and the bucking voltage supplied by battery 197′ through potentiometer 188 will drive the indicating circle 11 upwardly.

Rectifier tube 193 and condenser 194 serve as rectifier and filter, respectively, for the plate and focussing potentials of tube 3. Leads 200 supply filament current to the cathode of tube 3. The control grid 195 of tube 3 is shown connected through resistor 196 to potentiometer 197. Adjustment of this potentiometer controls the brilliance of the cathode ray trace spot. Commutator 122 is also provided in this form of the invention and serves to increase the value of the negative potential applied to the control grid 195 at the instant when commutators 42 and 43 are switching from one indication to another. By this means the electron beam is cut off during commutation and the back trace, or unwanted lines connecting the several indications, is eliminated. Focussing grid 198 is supplied with the proper potential and controlled from potentiometer 199.

Although the novel flight indicator is shown as adapted to simultaneously portray the indications of some half dozen instruments, it is to be understood that the indications of a lesser or greater number of instruments may be so portrayed, if desired, by use of suitable pick-offs similar to those illustrated and by the proper detection, amplification and application of the desired voltages through the commutating means to the deflecting plates of the cathode ray tube 3.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It will be apparent that the cathode ray tube may be provided with deflecting coils instead of deflecting plates, as is well known to those skilled in the art, and the expression "deflecting plates" in the following claims is to be understood as also covering deflecting coils.

What is claimed is:

1. In an aircraft flight indicator adapted to indicate the readings of a plurality of instruments on a single face, a plurality of instruments, electric pick-off means associated with said instruments for producing variable magnitude, reversible phase potentials in accordance with the indications of said instruments, means for supplying said pick-off means with A. C., thermionic detector-amplifiers for receiving the reversible phase and variable magnitude potential outputs of said pick-up means and for producing D. C. output control potentials, a cathode ray tube, and commutator means for applying said D. C. control potentials in desired sequence to the deflecting plates of said tube.

2. In an aircraft indicator of the character described, a cathode ray tube having vertical and horizontal deflecting plates and a fluorescent face, means for intermittently applying an alternating potential to said vertical plates and for synchronously applying an alternating potential of the same magnitude but displaced 90° in phase to said horizontal plates to thereby produce a circle at the center of said fluorescent face, means for intermittently applying an alternating potential to said vertical plates to produce a straight vertical line at the center of said face, means for intermittently applying an alternating potential to said horizontal plates to produce a straight horizontal line at the center of said face, said straight lines intersecting one another and said circle at the center of said face, and means for applying additional potentials to said plates to cause said circle and lines to move over said face in accordance with the attitude of the aircraft.

3. An aircraft indicator as defined in claim 2, wherein means is provided to apply an out of phase A. C. potential to said vertical plates synchronously with the application of said horizontal line producing A. C. potentials to said horizontal plates when said craft falls below a predetermined air speed, whereby said straight horizontal line is distorted to indicate such loss in air speed.

4. In an aircraft indicator of the character described, an aircraft compass, electrical pick-offs from said compass, on two mutually perpendicular axes, a cathode ray tube having vertical and horizontal deflecting plates and a fluorescent face, compass markings disposed around said face, and means connected to said pick-off for intermittently applying D. C. control potentials to said vertical plates and for synchronously applying D. C. control potentials to said horizontal plates, whereby a spot having an annular path of motion throughout 360° adjacent said compass markings is caused to appear on said face, said means being controlled so that said spot at any time, when read upon said compass markings, corresponds to the bearing of the aircraft.

5. An aircraft flight instrument, the combination with a radio receiver and an attitude indicating device showing both roll and pitch attitude, of a single instrument face, cathode ray means for indicating upon said face a plurality of separate aircraft indications, one of said indications having the appearance of a circle for indicating a radio beam path, and a second indication having the appearance of a horizon line for indicating both pitch and roll of the craft, said one indication being derived from said radio receiver and the second from said attitude indicating device, and means for independently moving said indications in accordance with the indications of said corresponding instruments.

6. An aircraft flight instrument, the combination with a radio receiver and a rate of turn indicating device, of a single cathode ray tube and means for indicating upon the face of said tube a plurality of separate aircraft indications, said indications being movable with respect to a common center on said face, one of said indications being derived from said radio receiver and another from said rate indicating device.

7. In combination, a plurality of aircraft indicating instruments, electrical pick-off means associated with said instruments, a circular screen, means for projecting a luminous pattern on said screen constructed of elements normally symmetrical with respect to the center thereof, said elements corresponding respectively to and being distinctive of the indications of said several instruments, means for projecting said elements sequentially at a rate which causes them to be simultaneously and continuously visible, and means responsive to the potentials generated by said electrical pick-offs for causing said pattern elements individually or in combination to move in accordance with change of the indications of said instruments from their normal values, whereby said pattern is caused to become unsymmetrical with respect to the center of said screen.

8. In an aircraft flight indicator adapted to indicate the readings of a plurality of instruments on a single face, a plurality of instruments, electric pick-off means associated with said instruments for producing variable magnitude reversible phase potentials in accordance with the indications of said instruments, means for supplying said pick-off means with A. C., thermionic detector-amplifiers for receiving the reversible phase variable magnitude potential outputs of said several pick-off means and for producing D. C. control potentials, a cathode ray tube having fixed markings on its face, commutator means for applying said D. C. control potentials in predetermined sequence to the deflecting plates of said tube, means for applying A. C. potentials to said commutating means for application in predetermined sequence to the deflecting plates of said tube to produce continuously visible luminous markings on the face thereof corresponding to and distinctive of the indications of said instruments, and means for applying certain of said D. C. control potentials to change the position of said luminous markings with respect to said fixed markings.

9. In an aircraft flight indicator adapted to indicate the readings of a plurality of instruments on a single face, a plurality of instruments, electric pick-off means associated with said instruments for producing variable magnitude reversible phase potentials in accordance with the indications of said instruments, an A. C. supply, means for exciting said pick-offs therefrom, thermionic detector-amplifiers for receiving the reversible phase variable magnitude potential outputs of said pick-off means and for producing D. C. control potentials therefrom, a cathode ray tube, commutator means for applying said D. C. control potentials in desired sequence to the deflecting plates of said cathode ray tube, means for supplying A. C. potentials derived from said supply to the deflecting plates of said tube in proper phase relationships to cause distinctive markings to be traced on the face of said tube, and means for applying certain of said D. C. potentials to the deflecting plates of said tube to position said distinctive markings in accordance with the indications of said several instruments.

10. An aircraft flight instrument for simultaneously and continuously indicating rate of turn and attitude, comprising the combination with a rate of turn indicating device, an attitude indicating device, a cathode ray tube, and common means for indicating upon the face of said tube a plurality of separate indications without interference therebetween, one of said indications being derived from said rate indicating device and another being derived from said attitude indicating device.

11. An aircraft flight instrument responsive to attitude sensitive devices providing as simultaneously and continuously visible luminous markings on the face of a cathode ray tube indications of the attitude of the aircraft with respect to three mutually perpendicular axes of rotation.

12. The combination with an aircraft horizon instrument having a horizon bar indicator and pick-off means on two mutually perpendicular axes, of a cathode ray tube, a pair of plates for deflecting the electron beam thereof in a horizontal direction, a pair of plates for deflecting said beam in a vertical direction, a source of A. C., means for applying an A. C. potential derived from said source to said pair of horizontally directed deflecting plates to produce a luminous line on the face of said cathode ray tube representing the horizon bar of said horizon instrument, means for exciting said pick-offs from said A. C. source, means for deriving a variable magnitude, reversible polarity D. C. control potential from the output of the said pick-off on one of said axes, means for applying said D. C. potential to said vertically deflecting plates to position said horizontal line in accordance with the position of the horizon bar on said horizon instrument.

13. The combination with an aircraft horizon instrument having pick-offs on two mutually perpendicular axes thereof, of a cathode ray tube, a pair of plates for deflecting the electron beam thereof in a horizontal direction, a pair of plates for deflecting said beam in a vertical direction, a source of A. C., means for applying an A. C. potential derived from said source to said pair of horizontally deflecting plates to produce a normally horizontal luminous line on the face of said cathode ray tube, means for exciting said pick-offs from said A. C. source, means for applying an A. C. potential proportional to the output of the said pick-off on one of said axes to said vertically deflecting plates in phase with the potential applied to said horizontally deflecting plates, whereby said horizontal line is caused to tilt to a position determined by the vector sum of the potentials applied to said two pairs of deflecting plates.

14. An aircraft navigational instrument comprising in combination, a cathode ray tube having a circular face, means for causing the electron beam of said tube to trace a luminous circle normally concentric with the face of said tube, means for causing said circle to be displaced from its central position to the right or left in accordance with the departure of the craft from the center of a radio directional beam, means for causing said circle to be displaced from its central position upwardly or downwardly in accordance with the departure of the craft from the center of an inclined radio landing beam, means for causing said beam to trace a luminous straight line visible simultaneously with said circle, said line being normally substantially coincident with horizontal diameters of said tube face and of said concentric circle, thereby forming a distinctive pattern normally centralized on said face, and means responsive to change of attitude of the craft for displacing said line from said position of coincidence with said horizontal face diameter.

15. An aircraft navigational instrument comprising in combination, a cathode ray tube, an annular scale on the face thereof, means for causing the electron beam of said tube to produce a luminous spot as an index readable on said scale, means for positioning said spot relative to said scale in accordance with the course of the craft, means for causing the electron beam of said tube to trace a normally straight horizontal luminous line normally centered on the face of said tube, means for displacing said horizontal line upwardly or downwardly from its central position responsive to pitch of the craft, means for rotating said line from the horizontal responsive to roll of the craft, means for distorting said line when the air speed of the craft falls below a predetermined value, means for causing the electron beam of said tube to trace a normally vertical luminous line, normally centered on the face of said tube, means for displacing said vertical line to the right or left of its central position in accordance with the rate of turning of the craft, means for causing the electron beam of said tube to trace a luminous circle normally concentric with the face of said tube, means for causing said circle to be displaced from its central position to the right or left in accordance with departure of the craft from the center of a radio directional beam, means for causing said circle to be displaced from its central position upwardly or downwardly in accordance with the departure of the craft from the center of an inclined radio landing beam, and means for causing said several luminous markings to be flashed in rapid succession on the face of said tube, whereby the persistence of vision of an observer renders said markings simultaneously and continuously visible.

16. In combination, mounted on an aircraft, a plurality of aircraft flight instruments, means cooperating with said instruments for producing potentials corresponding to and varying with the indications of said instruments, and a single indicator for simultaneously and continuously indicating the information provided by all of said instruments on a single face, said indicator comprising a cathode ray tube having beam deflecting means, and means for successively applying said potentials in rapidly repeated sequences to said deflecting means for producing continuously visible luminous markings on the face of said tube, each movable in accordance with the indications of its respective instrument, distinctive markings being produced for simultaneously portraying on one face the information supplied by each of said several instruments.

17. In combination, mounted on a common aircraft, a plurality of aircraft instruments and a single aircraft flight indicator for furnishing indications of said instruments, said indicator comprising a cathode ray tube having beam deflecting means, means for applying potentials in rapid succession to said deflecting means for causing the cathode ray beam to produce continuously visible markings on the face of said tube corresponding to and simulating the various movable indicating members of said instruments, individual electrical pick-off devices connected with said instruments sensitive to changes of indication thereof, individual electrical transmission circuits connected therewith, and thermionic means connected with said pick-off transmission circuits and responsive to the outputs of said pick-offs for supplying control potentials to said deflecting means for actuating said markings in accordance with changes in the indications of said instruments.

18. In combination, a course indicating aircraft instrument, electrical pick-offs on two mutually perpendicular axes thereof, commutating means, thermionic amplifying and rectifying means for receiving the outputs of said electrical pick-offs and for producing D. C. control potentials for delivery to said commutating means, and a cathode ray tube having two pairs of deflecting plates connected to said commutating means, said pairs being mutually perpendicular, whereby the control potential derived from one of said pick-offs due to operation of said instrument is successively and rapidly applied to one pair of said plates and the control potential derived from the other pick-off is similarly applied to the other pair of said plates, said intermittent operation occurring at a rate which causes an apparently continuous indication to be produced by said cathode ray tube positioned on the face thereof in accordance with the relative magnitudes of said two potentials.

19. In an aircraft flight indicator adapted to indicate the readings of a plurality of instruments on a single face, a plurality of instruments, electrical pick-off means associated with each of said instruments for producing variable magnitude reversible phase potentials in accordance with the indications of said instruments, an A. C. supply, means for exciting said pick-offs therefrom, thermionic detector amplifiers for receiving the reversible phase and variable magnitude potential outputs of said several pick-off means and for producing D. C. variable magnitude reversible polarity control potentials therefrom, a cathode ray tube, commutator means for applying one of said D. C. control potentials and an A. C. potential proportional to the output of one of said pick-offs through said commutator means to one pair of deflecting plates, and means for applying the A. C. supply simultaneously through said commutator means to other plates of said tube.

20. An aircraft navigational instrument comprising in combination a cathode ray tube, means for causing the electron beam of said tube to trace a normally straight horizontal luminous line, means for causing said beam to trace a vertical line visible simultaneously with said first line, said two lines normally intersecting perpendicularly at the center of the face of said tube to form a cross, and means for altering said centralized cruciform pattern as to form and position responsive to change of attitude and to turning of the craft including means for displacing said horizontal line upwardly or downwardly from its central position responsive to pitch of the craft, means for laterally tilting said line about its center responsive to roll of the craft, and means for displacing said vertical line to the right or left of its normally central position responsive to the rate of turning of the craft about a vertical axis.

21. In combination, a plurality of indicating instruments, means for producing reversible polarity D. C. potentials proportional to the several indications thereof, a cathode ray tube, means including a commutator for applying said D. C. potentials in rapid succession to deflecting plates of said tube, an A. C. supply, means for supplying potentials derived from said supply to deflecting plates of said tube in rapid succession through said commutator, and means for generating and applying through said commutator potentials to render said tube inoperative in the intervals between the application of said A. C. and D. C. deflecting potentials.

22. An aircraft navigational instrument as claimed in claim 20, having means for distorting said horizontal line responsive to loss of the critical air speed of the craft.

23. In combination, aircraft instruments responsive to attitude, rate of turn and position of a craft relative to a radio beam, means for generating potentials responsive to the indications thereof, a circular screen, means for projecting a luminous pattern on said screen normally symmetrical with respect to the center thereof, said pattern including as elements an internal cross having vertical and horizontal limbs and an external circle concentric therewith, means for projecting said pattern elements sequentially at a rate which causes them to be simultaneously and continuously visible, means for displacing said cross responsive to said attitude and rate of turn potentials, and means for displacing said circle responsive to said radio indication potentials whereby said pattern is caused to become unsymmetrical with respect to the center of said screen with changes of indication of said instruments.

24. As a navigational aid, mounted on a common aircraft, in combination, a plurality of flight instruments indicating attitude of the craft and direction of flight, means for obtaining potentials proportional to the indications of said several instruments, a cathode ray tube having a beam controlling element and beam deflecting means, and A. C. supply, a plurality of segmental commutators, a beam controlling commutator having its segments aligned with gaps between segments of said first named commutators, said several commutators being synchronously driven by common means, means for applying said instrument potentials and potentials derived from said supply to the deflecting means of said tube in desired sequence through at least one of said first named commutators to draw patterns on the face of said tube distinctive of said several instruments and to move each of said patterns from a reference position, and means for applying potentials to the control element of said tube through said beam controlling commutator to prevent distortion of or undesired interconnection between said patterns.

25. Apparatus mounted on an aircraft for aiding in piloting the craft comprising in combination, a plurality of instruments having electrical outputs altered by departure from normal flight conditions, a single cathode ray tube, means for applying potentials to said tube adapted to deflect the beam therein in a manner causing individually distinctive patterns to be traced on the face of said tube representative of said several instruments, commutating means for causing said several patterns to be flashed on said face in sufficiently rapid sequence to be simultaneously visible as distinctive indications, fixed indexes defining the normal positions of said patterns under normal flight conditions, said first named means including means for independently deflecting each of said patterns from its normal position with respect to its index in accordance with and responsive to changes in the respective outputs of said instruments, whereby departure from a desired condition to which any of said instruments is sensitive is immediately indicated.

26. Apparatus mounted on an aircraft as a navigational aid comprising in combination, a plurality of instruments responsive to and having electrical outputs variable with departure from normal flight conditions, a single cathode ray tube, means for applying potentials to said tube to deflect the beam therein in a manner causing individually distinctive patterns to be traced on the face of said tube representative of said several instruments, commutating means for applying said potentials in rapidly repeated sequences to cause said patterns to be simultaneously visible, said several patterns collectively constituting an assembly formed and positioned under normal flight conditions for symmetry about horizontal and vertical lines passing through the center of the face of said tube, and means for causing the outputs of said instruments under abnormal flight conditions to displace said patterns and thereby destroy the symmetry of said assembly relative to said lines.

27. Apparatus mounted on an aircraft as a navigational aid comprising in combination a plurality of instruments responsive to flight conditions, a single cathode ray tube, and means for transferring the indications of said instruments to the face of said tube as simultaneously visible individually distinctive patterns, said means comprising means for deriving and applying to said tube control potentials suitable for tracing said patterns, pick-offs associated with said instruments for translating the indications thereof into electrical potentials, each of said pick-offs including a pair of non-contacting cooperative members relatively displaceable in accordance with the indication of the instrument with which said pick-off is associated, means for exciting said pick-offs for obtaining therefrom control potentials suitable for controlling the positions of said patterns on the face of said tube in accordance with the displacements of said members, and commutating means for applying said several control potentials to said cathode ray tube in rapidly repeated sequences for causing said patterns to be simultaneously visible and independently positionable.

28. Apparatus mounted on an aircraft as a navigational aid comprising in combination a plurality of instruments responsive to flight conditions, a single cathode ray tube, and means for transferring the indications of said instruments to the face of said tube as simultaneously visible individually distinctive patterns, said means comprising means for deriving and applying to said tube control potentials suitable for tracing said patterns, pick-offs associated with said instruments, each of said pick-offs including a pair of electrical circuits having potentials induced therein by an exciting source and means for differentially varying said induced potentials in accordance with the indication of the instrument with which said pick-off is associated, means for obtaining from said induced potentials a control potential suitable for positioning on the face of said tube the pattern distinctive of the instrument with which said pick-off is associated, and commutating means for applying said several control potentials to said cathode ray tube in rapidly repeated sequences for causing said patterns to be simultaneously visible and independently positionable.

29. In the guiding of an aircraft to a landing field, the method which comprises producing on the aircraft a plurality of visual images indicative by their positions with respect to each other of the position and attitude of the aircraft, and substantially simultaneously controlling the positions of said plurality of visual images in accordance with energy radiated from the landing field and with energy developed on the aircraft to indicate the position of the aircraft with reference to a preselected approach path and the orientation of the aircraft with respect to a plurality of its axes.

30. In the radio-aided guiding of an aircraft carrying a gyroscopic device indicative of an orientation factor, the method which comprises producing on the aircraft a plurality of visual images indicative by their positions with respect to each other of the position and the orientation of the aircraft about a plurality of axes, and controlling the positions of said visual images in accordance with said gyroscopic device and with energy radiated from the landing field.

31. In the operation on an aircraft of guiding apparatus including an electronic tube having a screen and voltage-controlled means for producing images on the screen, the method which comprises forming first, second and third images on the tube screen, moving the first image vertically in accordance with the pitch of the aircraft and angularly in accordance with bank of the craft, moving the second image laterally in accordance with the turn or yaw of the aircraft, and moving the third image vertically and laterally in accordance with the location of the aircraft with respect to a preselected path of travel.

32. In apparatus for guiding an aircraft to a landing field, the combination with a cathode ray tube, and means for producing a plurality of visual images substantially simultaneously on the screen of said tube, of means responsive to energy radiated from the landing field for displacing at least one of said images vertically and laterally from a predetermined location to indicate the location in space of the aircraft with respect to a predetermined flight path, and means responsive to an attitude-indicating device on the aircraft for controlling the displacement of another of said images to indicate the orientation of the aircraft.

33. Guiding apparatus for use on aircraft comprising a cathode ray tube, means for producing a plurality of continuously visible images on the screen of the tube, means including a radiant energy receiver for displacing one of said images in accordance with the position of the aircraft with respect to a preselected course of flight, and means including a gyroscopic device for displacing another image in accordance with the attitude of the aircraft.

34. Guiding apparatus as claimed in claim 33, wherein said last means includes means for developing a voltage that varies with the pitch of the aircraft.

35. Guiding apparatus as claimed in claim 33, wherein said last means includes means for developing a voltage that varies with the yaw of the aircraft.

36. Guiding apparatus for use on an aircraft comprising a cathode ray tube having vertical deflecting means and horizontal deflecting means, means including a receiver responsive to energy radiated from a landing field and a gyroscopic bank-and-climb indicator for producing a plurality of sets of control voltages proportional respectively to factors indicative of the position and the attitude of the aircraft, and commutating means for impressing said sets of control voltages in sequence on said deflecting means at a rate resulting in the production of a plurality of continuously visible images by the tube.

37. Guiding apparatus for use on aircraft comprising a cathode ray tube having vertical and horizontal deflecting means, means for impressing on said deflecting means control voltages proportional to the displacement of the aircraft from a preselected course of travel, means for impressing on said deflecting means a control voltage proportional to the departure of the direction of travel of the aircraft from a preselected course, and means for impressing on said deflecting means control voltages proportional to the bank and the climb attitude of the aircraft.

38. In apparatus for guiding an aircraft having gyroscopic orientation indicating devices, means controlled by said devices for producing voltages varying with the orientation of the aircraft with respect to a plurality of its major axes, and means responsive to radiations emanated from a landing field to produce voltages varying respectively with the vertical and the horizontal displacements of the aircraft from a preselected path of travel.

39. In the operation on an aircraft of guiding apparatus including an electronic tube having a screen and voltage-controlled means for producing images on the screen, a receiver responsive to radiant energy reaching the aircraft from a landing field, and an orientation indicating device; the method which comprises producing on the screen of the tube a plurality of continuously visible images, producing by said receiver and said indicating device control voltages that vary with the location and the orientation, respectively, of the aircraft, and controlling the position of each of the continuously visible images on the tube screen by said control voltages.

40. In the guiding of an aircraft to a landing field, the method which comprises producing on a fluorescent screen on the aircraft a plurality of continuously visible images indicative by their positions on the screen of the position and attitude of the aircraft in space, and controlling the positions of said images in accordance with energy radiated from the landing field and in accordance with energy developed on the aircraft, to indicate the position of the craft with respect to a predetermined approach path and the attitude of the craft with respect to a plurality of reference axes.

41. In the guiding of an aircraft carrying a gyroscopic device indicative of an orientation factor, the method which comprises producing on a fluorescent screen on the craft a plurality of continuously visible images indicative by their locations on the screen of the position and orientation of the aircraft, and controlling the location of said images in accordance with said gyroscopic device and in accordance with energy radiated from the landing field.

42. In the operation on an aircraft of guiding apparatus including a cathode ray tube, a receiver for crossed beams radiated from a landing field, and a gyroscopic device; the method which comprises producing on the cathode ray tube a plurality of continuously visible images, and selectively controlling the displacements of the several images in accordance with electrical voltages developed respectively by said receiver and by said gyroscopic device.

FRANCIS L. MOSELEY.